United States Patent [19]

Allen

[11] Patent Number: 4,811,796

[45] Date of Patent: Mar. 14, 1989

[54] FIRE FIGHTING APPARATUS

[76] Inventor: Stephen D. Allen, P.O. Box 607, Tomball, Tex. 77375

[21] Appl. No.: 85,806

[22] Filed: Aug. 17, 1987

[51] Int. Cl.⁴ .............................................. A62C 35/12
[52] U.S. Cl. ...................................... 169/62; 169/54; 152/DIG. 5; 280/836
[58] Field of Search ............... 169/43, 46, 47, 54, 169/62, 9, 24; 280/5 B; 152/DIG. 5, DIG. 11

[56] References Cited

U.S. PATENT DOCUMENTS

| | | |
|---|---|---|
| 1,381,657 | 6/1921 | Pearsons . |
| 1,471,207 | 10/1923 | Riddle . |
| 2,147,494 | 2/1939 | Miller ................................ 123/61 |
| 2,203,564 | 6/1940 | Farnsworth ............... 152/DIG. 5 X |
| 2,230,201 | 3/1939 | Hermann ............................ 103/262 |
| 2,293,796 | 8/1942 | Bestor ................................. 269/84 |
| 2,581,914 | 1/1952 | Darrow .................... 152/DIG. 5 X |
| 2,593,696 | 4/1952 | Pool ................................ 280/5 B |
| 2,847,049 | 8/1958 | Blomquist ................. 152/DIG. 5 |
| 2,950,146 | 8/1960 | Lease ................................. 302/58 |
| 3,059,942 | 10/1962 | Kirk et al. ........................... 280/5 |
| 3,169,581 | 2/1965 | Cummins ............................ 169/24 |
| 3,191,974 | 6/1965 | Mann et al. ........................ 285/158 |
| 3,216,735 | 11/1965 | Larson et al. ..................... 280/5 B |
| 3,264,007 | 8/1966 | Rill et al. ......................... 280/5 B |
| 4,062,407 | 12/1977 | Bentrup ............................... 169/47 |
| 4,159,790 | 7/1979 | Bailey ............................... 222/211 |
| 4,198,984 | 4/1980 | Taylor ............................... 128/349 |
| 4,218,015 | 8/1980 | Dean .................................. 239/147 |

FOREIGN PATENT DOCUMENTS 226814 1/1959 Australia .
901755 5/1959 United Kingdom .

OTHER PUBLICATIONS

"Use Water To Inflate Tires", *Scientific American*, 4/1937, p. 271.

Primary Examiner—Sherman D. Basinger
Assistant Examiner—Paul E. Salmon
Attorney, Agent, or Firm—Vaden, Eickenroht, Thompson & Boulware

[57] ABSTRACT

There is disclosed apparatus for use in fighting fire in and around heavy, self-propelled vehicles by means of a liquid ballast contained within the large, tubeless tires of the vehicle. In the event of a fire, a hose is connected to a coupling which is in turn connected to a fitting connected to means forming a hole in the rim of a wheel so as to permit liquid to be forced out of the tire and through a nozzle on the end of the hose by air pressure within the tire. The apparatus also includes at least one other fitting and another coupling connectible to the fitting, together with an additional hose connectible to one fitting in order to permit liquid ballast to be added to the tire, as air in the tire is vented through another fitting, and then pressurized by the addition of air through a compressed air line connected to one of the couplings.

11 Claims, 3 Drawing Sheets

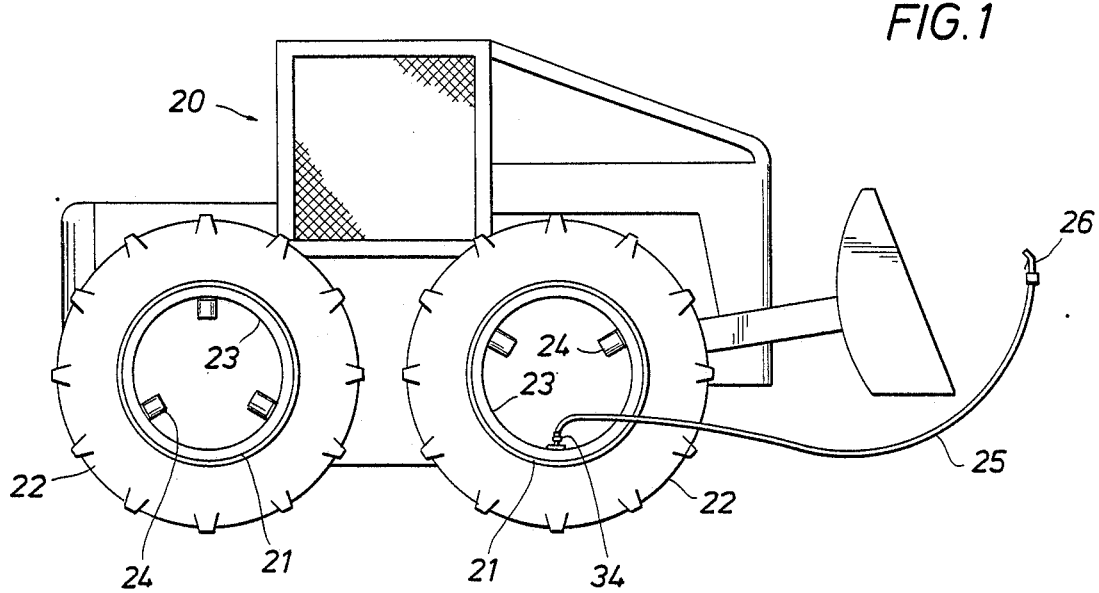
FIG. 1
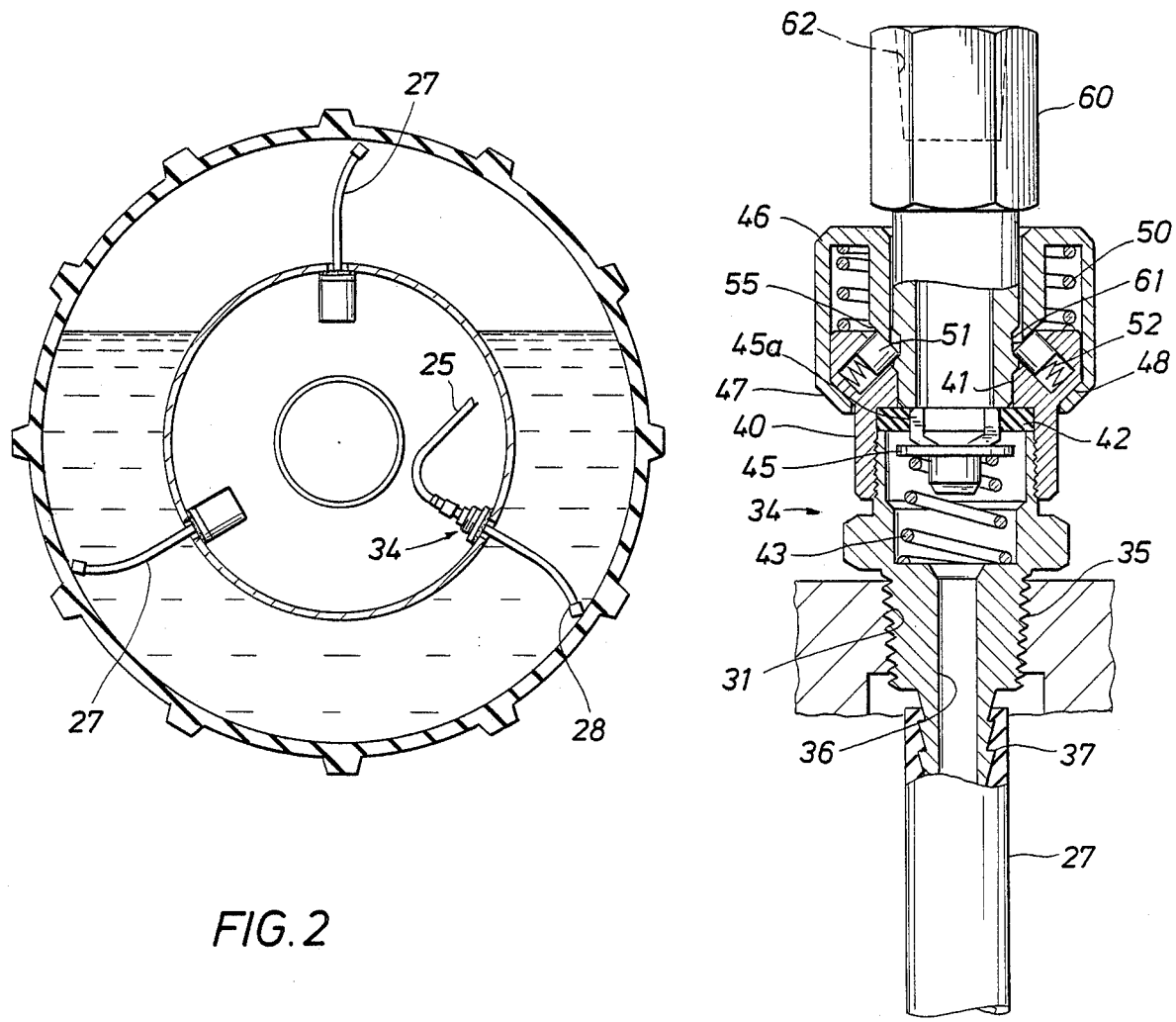
FIG. 2
FIG. 3

FIRE FIGHTING APPARATUS

This invention relates generally to apparatus for use in fighting fire or in and around heavy, self-propelled vehicles having large, tubeless tires in which a liquid ballast may be contained. More particularly, it relates to improvements in apparatus of this type wherein the fire may be extinguished by means of the liquid ballast.

Various heavy duty self-propelled vehicles, including those used in the timber, farm and construction industries, are typically powered by diesel fuel and of such a size as to require the use of tubeless rubber tires containing a liquid ballast and weighing many hundreds of pounds and costing thousands of dollars each. In the course of normal operation, leaking diesel fuel oil and fumes may be mixed with leaves and other debris drawn into the engine compartment. This mixture of debris and oil, when brought into contact with a hot exhaust manifold, often results in fires that cannot be extinguished with small portable fire extinguishers alone.

Heavy vehicles of this type typically rely upon the use of disc brakes, and on many occasions, these brakes tend to stick or otherwise not completely release during use, thereby causing a substantial build-up of frictional heat. Inasmuch as the disc brakes may be designed to run through a reservoir of oil, this heat may cause the oil to flash into a fire when the vehicle is stopped. Also, of course, even if they don't cause fires, hot brakes and bearings may require water cooling.

When these fires, whether caused by hot brakes or engine compartment debris or otherwise, spread to the rubber tires, a particularly serious problem is created since rubber fires are extremely difficult to extinguish. Even if a portable fire extinguisher is utilized to put out such a fire, the tremendous heat retention of the rubber often causes the tire to burst into flames again. Only after a deep cooling of the hot rubber will this continuing "flash" fire effect be eliminated. As can be appreciated, this requires the use of a substantially large amount of a quenching liquid before an adequate cooling of the heated surfaces can be accomplished.

One of the current and most often used means for fighting such fires is a tank of fire fighting liquid secured to the top of the operator cab. Typically, these tanks are quite heavy, and require various air, water and pressure release valves within the operator compartment, as well as a substantial length of coiled, water delivery hose.

As will be appreciated, the tanks substantially increase the height of the vehicle to the point that it may experience difficulty in passing under overpasses, various tree limbs and similar obstructions. Frequently, the tanks are damaged or torn away from the carrying vehicle when an operator fails to notice the presence of such an obstruction.

An overhead mounted water tank is of limited water-carrying capacity, since too large a volume of water would result in the vehicle becoming overly topheavy. In this regard, any amount of water stored on the roof of the operator cab will create some top-heaviness, which in turn could contribute to an overturning of the vehicle, especially where a sloping terrain is involved.

The tank is also quite expensive and is subject to vandalism, including destructive vandalism. Also, the associated fire fighting hose is particularly attractive to vandals. The cost of continually repairing or replacing damaged or stolen water tanks, whether caused by vandalism or by striking overhead objects, is prohibitive.

These fires may occur very quickly and spread very rapidly, whereby an operator may have very little time to escape from the cab if a fire were to reach that area. Accordingly, a cab-mounted water tank may, in many cases, prove to be useless since the operator does not have time to go through the operation of uncoiling the water supply hose and to actuate the needed valves to permit a dispensing of the water in the tank.

Because of these risks, insurers may require the operator to carry large fire extinguishing equipment in addition to the cab-mounted water tank. Unfortunately, operators of such vehicles frequently remove the extinguishers from a cab since they are prone to breaking loose under difficult operating conditions.

Bentrup U.S. Pat. No. 4,062,407 discloses a wheel of a vehicle of this type having a tire provided with four equally circumferentially spaced fittings or valves, and a pair of hoses each having a coupling on one end for "quick" connection to and disconnection from one of the valves. The opposite end of one hose is shown connected to a tank or container of compressed gas, and the other hose is shown to have a nozzle on its opposite end. More particularly, the first such hose is adapted to be coupled to an upper valve of the tire above the level of liquid ballast in the tire, and the second is adapted to be coupled to a lower valve below the liquid ballast level. Thus, a valve on the tank may be opened to pressurize the ballast liquid so that, upon opening of the nozzle on the other hose, liquid may be dispensed from the tire for use in fighting a fire in and around the vehicle.

As a practical matter, the tank is of such size and weight as to make it difficult if not impossible to store on the vehicle, much less permit it to be handled easily and quickly by a person or persons in and around the vehicle, particularly under emergency conditions. Also, of course, without an expensive regulator on the tank, gas could be supplied to the tire at a pressure which could cause it to explode, and without a gauge, the vehicle operator has no way of knowing whether or not the gas within the tank is at a required pressure.

In addition, in the Bentrup apparatus, it is impossible to empty the tire of liquid to a level lower than the lowermost valve. In vehicles of this type, wherein the tires are of large radial extent, this severely limits the amount of the liquid ballast available for fighting the fire. Also, the valves or fittings can apparently not be replaced or repaired without removal of the tire from the rim of the wheel.

In vehicles of this type, it is standard practice to supply liquid ballast to the tire, or alternatively remove liquid ballast from the tire when, for example, the tire must be removed from the rim of the wheel in order to be repaired or replaced through the standard valve stem to which an air line may be connected for inflating the tire. This, of course, is a slow and time consuming process, and, as noted above in connection with the Bentrup apparatus, does not in any case permit all of the liquid ballast to be removed from the tire. Furthermore, Bentrup suggests no means other than a standard valve stem for either adding liquid ballast to or removing it from the tire.

These and other shortcomings of the Bentrup apparatus are believed to be the reason it has not, to my knowledge, been commercialized, despite the many problems with existing equipment now used for this purpose, and the primary object of this invention is to provide apparatus of this type which obviates these and other shortcomings of the Bentrup apparatus.

More particularly, it is the object of this invention to provide such apparatus in which the liquid ballast may be dispensed form the tire without the need for a large, heavy tank of pressurized gas, in which substantially all of the liquid ballast may be removed from the tire, either for fighting fire or otherwise, in which valves or fittings connecting with the tire are easily accessible for replacement or repair without removal of the tire from the rim of the wheel, wherein the liquid ballast may be added to, as well as removed from, the tire with a minimum of time and effort, and which is of such construction that it may be incorporated into existing wheels with a minimum of time and investment.

These and other objects are accomplished, in accordance with the illustrated embodiment of the invention, by apparatus which includes a wheel having a rim on which a tubeless tire is adapted to be mounted and means forming a plurality of holes spaced generally equally about the rim to connect with the interior of the tire, and a plurality of fittings each having means for connection to a hole forming means with a bore therethrough adapted to open to the tire, when so connected, and an inwardly facing seat about the bore and a closure member yieldably urged toward a seated position to close the bore. More particularly, the apparatus further includes a plurality of couplings each of which is adapted to be moved into an inner position within the outer end of the bore of a fitting to engage and move the closure member to an unseated position, with each fitting and coupling having means thereon adapted to releasably attach the coupling to the fitting in its inner position.

More particularly, each such coupling has a bore therethrough which opens to the fitting bore when attached thereto and means on its outer end to which a first hose may be connected in order to permit liquid to be added to the tire as air is vented from the tire through another coupling connected to another fitting, or to which an adapter having a valve stem therein may be connected to receive air from an air hose in order to pressurize the liquid in the tire while the other coupling is removed from the other fitting to permit it to close, or to which a second hose having a nozzle on its outer end may be connected in order to dispense the pressurized liquid from the tire upon opening of the nozzle, again of course, while the other fitting is closed. Hence, it is possible to fight the fire with air pressure normally used in the tires of such vehicles, and thus without the need for a large tank of gas, at a pressure which, if not controlled, could seriously injure personnel in and around the vehicle. Furthermore, this is made possible with an assembly of parts including fittings connecting with the interior of the tire in such a manner that they may be replaced or repaired without the necessity of removing the tire from the rim of the wheel.

More particularly, the apparatus further includes a plurality of flexible tubes each having one end connectible to the inner end of a fitting and thus forming a continuation of the bore through the fitting, in order to dispose its other end near the inside of the tire when fully inflated, and being of such diameter that it may pass into and out of a hole as the fitting is connected to or disconnected from the means which forms the hole. Thus, it is possible to empty substantially all if not all of the liquid ballast in the tire, depending on the location of the fitting to which the tube is connected with respect to the ground surface.

Also, the relatively large openings through the fitting and the coupling permit the liquid ballast to be supplied to the tire, or alternately to be dispensed therefrom, much more quickly than is possible with apparatus which operates by supplying the liquid ballast to or removing it from the tire through a conventional valve stem. More particularly, the apparatus above described permits a standard wheel to be retro-fitted with only a minimum of alteration and parts at least some of which may be otherwise conventional and readily available parts.

In the preferred and illustrated embodiment of the invention, each hole forming means has threads for connection with threads on the fittings, preferably with female threads being formed in the hole to receive male threads on the fitting. As also illustrated, the means on the coupling to which the adapter and/or hoses may be connected comprises threads on its outer end. More particularly, the apparatus also includes a plurality of covers each having means for connection to the rim over and about a fitting to protect the fitting from damage when the coupling is removed from it. Preferably, each hole forming means comprises a boss welded to the rim and having threads thereon to which a cover may be connected.

In the drawings, wherein like parts are designated throughout by like reference characters;

FIG. 1 is a side view of a vehicle of the type above described and having both wheels on one side thereof provided with apparatus of the type constructed in accordance with the present invention and showing a cover removed from one fitting of the front wheel to which a hose having a nozzle on its outer end is connected by means of a coupling releasably connected to the fitting to open the bore therethrough, whereby liquid ballast may be dispensed from the tire upon opening of the nozzle;

FIG. 2 is an enlarged vertical sectional view of the front wheel and tire, as shown in FIG. 1, but with the tire in section to show the flexible tubes extending from each fitting into the tire;

FIG. 3 is a further enlarged, longitudinal sectional view of a fitting connected to the rim of the wheel with a hose connected to its inner end and a coupling releasably connected to its outer end to engage and hold the closure member in open position;

Figure 6:
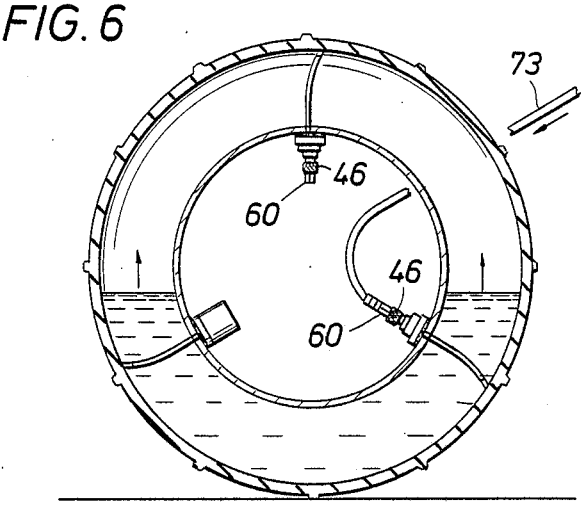
FIG. 6 is a cross-sectional view of one of the wheels, with a garden hose connected to a coupling connected to one of the lower fittings, and with a coupling releasably connected to another fitting adjacent the upper end of the tire so as to vent the space in the upper end of the tire as liquid is added thereto through the hose.
Figure 8:
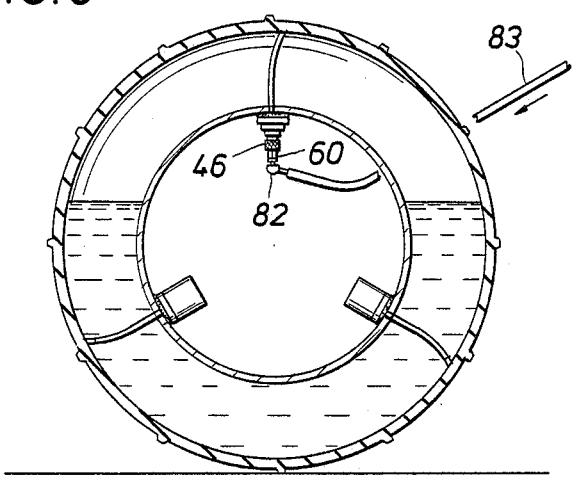
Figure 9:
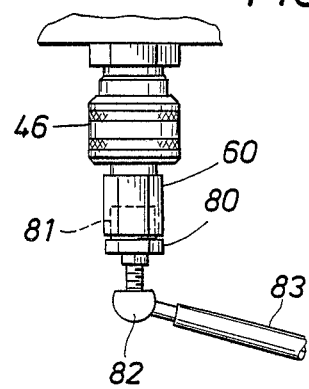
Figure 10:
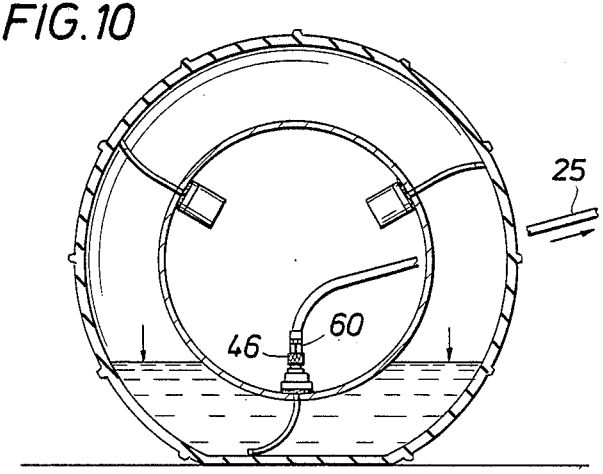
Figure 11:
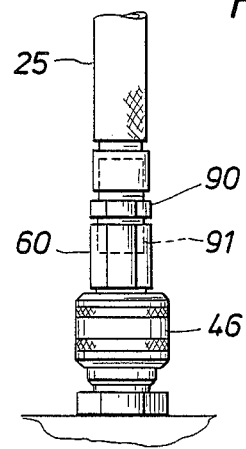

FIG. 8 is a view similar to FIG. 6, but upon removal of the garden hose and the coupling form one of the lower fittings to permit a cover to be installed over the fittings, and connection of an adapter to the coupling releasably connected to the upper fitting so as to permit an air line to be connected to the adapter for pressurizing the space in the tire above the liquid introduced into the tire to its normal level;

FIG. 9 is an enlarged view of the coupling releasably connected to the uppermost fitting, and with the adapter releasably connected to the outer end of the coupling so as to permit the air line to be connected thereto, as shown in FIG. 8;

FIG. 10 is a view similar to FIGS. 6 and 8, but with another hose connected to the coupling connected to the lowermost fitting of the rim so as to permit liquid ballast to be dispensed therefrom and showing the water level lowered in the tire so as to permit it to flatten somewhat; and FIG. 11 is an enlarged, detailed view of the coupling threaded to the lowermost fitting, and with the dispensing hose threadedly connected to the outer end of the coupling, as shown in FIG. 10.

With references now to the details of the above described drawings, the vehicle shown in FIG. 2, and indicated in its entirety by reference character 20, is of a self-propelled type previously described as having wheels 21 with tubeless tires 22 disposed about the rims 23 thereof. The tires are of large diameter, as can be seen from FIG. 1, adapted to be filled with a liquid ballast for reasons previously described.

Each wheel and tire of the right-hand pair is provided with parts of the apparatus of the present invention, which, as above mentioned and as will be described in detail, includes means forming three holes in equally spaced relation about the rim to connect with the tire and fittings threadedly connected to each hole forming means. As shown in FIG. 1, covers 24 are releasably connected to the rim of the rear wheel above and about each fitting thereon so as to protect the fittings against damage during normal usage of the vehicle. However, as also shown, one such cover has been removed from the lowermost fitting 34 of the front wheel, and a hose 25 having a nozzle 26 on its end has been connected to the exposed fitting so as to permit liquid ballast to be dispensed from the tire in order to fight fires in and around the vehicle.

As shown in FIG. 2, and as will be described in detail to follow, a flexible tube 27 is connected to the inner end of each fitting 34 and extends to the inner side of the tire. More particularly, and as will be apparent form FIG. 2, each tube is of a length somewhat greater than the radial distance between the rim and the tire when the tire is fully inflated, so that the outer end of the tube will at all time be adjacent the inside of the tire. Thus with the wheel turned to the position in which the fitting to which the tube is connected is lowermost, as shown in FIG. 10, the outer end of the tube will be at the lowermost level in the tire so that all or at least substantially all of the liquid ballast may be removed therefrom. As the liquid is dispensed from the tire, and the tire flattens somewhat, as shown in FIG. 10, the outer end of the tube will bend so that its outer end remains at the lowermost level within the tire. As shown, a screen 28 is connected to the outer end of each tube so as to keep the outer end of the tube open regardless of its orientation with respect to the inside of the tire.

Figure 4:
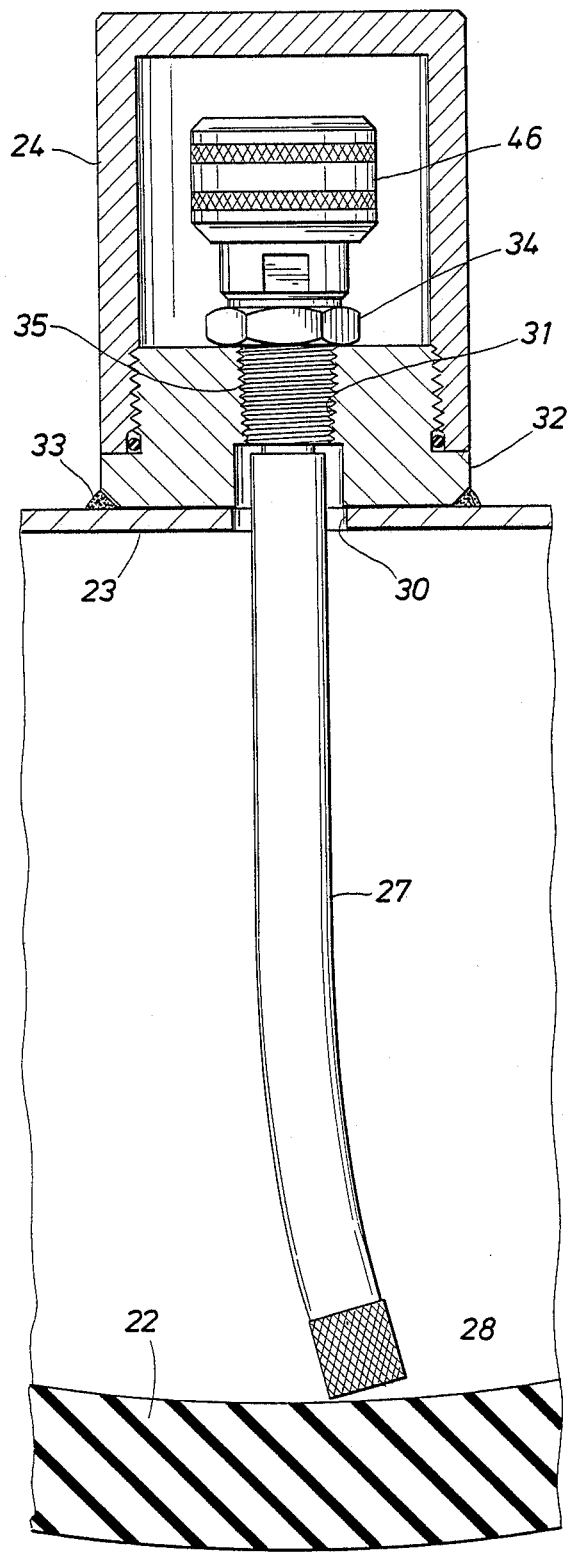
FIG. 4 is an enlarged view of a fitting, coupling, and tube, with the fitting connected to a threaded hole in a boss welded to the rim of the wheel, and a cover threadedly connected to the boss above and about the coupling.
Figure 5:
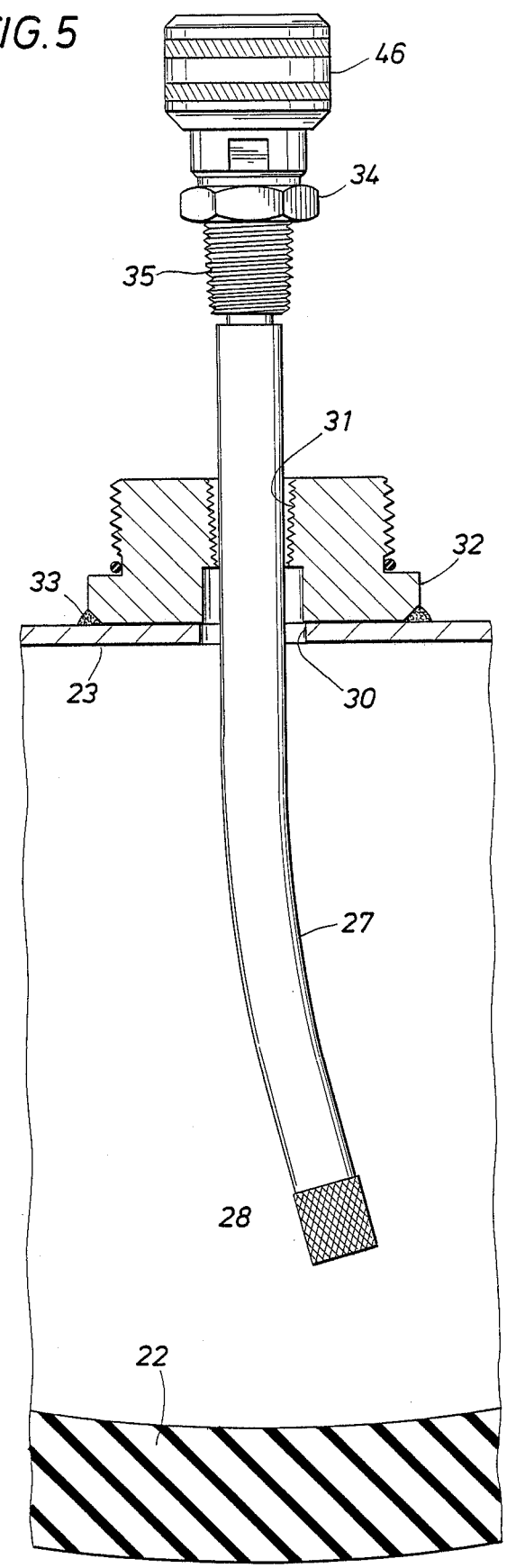
FIG. 5 is a view similar to FIG. 4, but upon removal of the cover from the boss and with the fitting disconnected from the hole in the boss to permit the tube connected to the fitting to be moved into or removed from the tire and rim.

As shown in FIGS. 4 and 5, the rim 23 of each wheel has three holes 30 drilled therein, each of which is aligned with a threaded hole 31 formed in a boss 32 welded about its periphery to the inside of the rim, as shown at 33. As best shown in FIG. 3, each fitting 34 has an inner tubular part with threads 35 formed thereabout releasably connected to the threaded hole 31 and a bore 36 therethrough which opens to the tube on its inner end.

The fitting also includes an intermediate tubular part 40 threadedly connected to the outer end of the inner part and having a bore 41 therethrough forming a continuation of the outer end of the bore through the inner part. A rubber seat 42 is held between the opposite ends of the intermediate and inner parts of the fitting, and a disc-shaped closure member 45 is mounted in the outer end of the bore of the inner part fitting for reciprocation between an upper position engaged with the seat to close the bore through the fitting, and a lower position (FIG. 3) to open the bore through the fitting. The closure member is urged to its uppermost position by means of a coil spring 43 having its lower end mounted on a shoulder in the bore of the inner tubular part. The valve closure member is guided during its vertical movement by means of a spider 45a received closely within the rubber seat 42.

The fitting further includes an outer coupling part 46 which is mounted on the intermediate part for vertical reciprocation with respect thereto and retained thereon by means of a flange 47 on its inner end turned over a shoulder 48 about the intermediate part. The coupling part 46 is urged to its outermost position with respect to the intermediate part by means of a coil spring 50. A series of detents 51 are carried for reciprocation within the intermediate part and are urged by coil springs 52 within the sockets inwardly and upwardly to positions in which they engage with a stop shoulder 55 on the coupling part of the fitting.

The apparatus further includes a plurality of couplings 60 each comprising a tubular body having an inner end adapted to be received closely within the bores of the intermediate and coupling parts of the fitting. As can be best understood from FIG. 3, as a coupling is moved inwardly to a seated position within the intermediate part, its inner end engages the spider 45a to move the closure member to the open position and dispose a groove 61 thereabout opposite the ends of the detents 51. Thus, the detents are urged into the groove to hold the coupling in its inner position and thus holding the closure member open. On the other hand, the coupling part of the fitting may be urged downwardly against the force of the spring 55 to cam the detents inwardly and thus move them out of the groove 61 so that the coupling 60 may be easily and quickly connected to or disconnected from the fitting.

As shown in FIG. 3, female threads 62 are formed in the outer end of the bore of the coupling for connection with various parts which, as above mentioned and as will be described to follow, enable liquid ballast to be supplied to and dispensed from a tire for use in fighting fire in and around the vehicle. In any event, it will be understood that the bore through the coupling, which forms a continuation of the bore through the fitting and thus the tube 27, has a large cross-sectional area through which air or liquid ballast may be passed. Consequently, and as previously described, the apparatus is useful not only in dispensing liquid ballast for the purpose of fighting fires, but also in permitting the liquid ballast to be added to the tire, while venting air therefrom or alternatively to be removed form the tire, in the event the tire is damaged and requires repair or replacement and thus removal from the rim.

Figure 7:
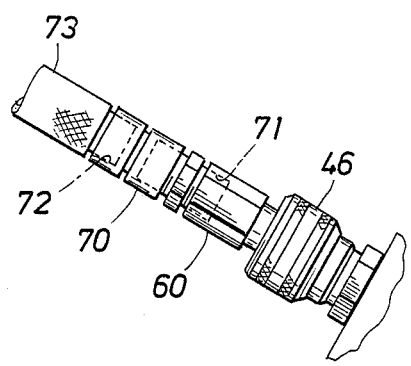
FIG. 7 is an enlarged detailed view of the fitting, coupling, and an adapter on the end of the garden hose connecting it to the coupling as shown in FIG. 6.

As shown in FIGS. 6 and 7, the vehicle has been moved to a position in which one of the fittings is in an uppermost position, and the cover has been removed from it to permit a coupling 60 to be connected to that fitting to vent the upper portion of the space within the tire. At the same time, the cover has been removed from the lower fittings to permit a hose 73 to be connected thereto by means on an adapter 70, as shown, the adapter has female threads 72 for threaded connection to male threads conventionally found on the end of the hose 73 whose opposite end (not shown) may be connected to a standard water hydrant. The adapter therefore permits the hose 73 to be connected in line with the coupling and thus the fitting to which the coupling is connected in order to permit water to be supplied through the large cross-sectional area of the coupling, fitting and hose as air is vented from the upper portion of the space within the tire through the large cross-sectional area of the uppermost coupling.

As illustrated in FIGS. 8 and 9, and as previously mentioned, after liquid ballast has been added to the desired level within the tire, the hose 73 and adapter 70 are removed from the lower coupling and the lower coupling is removed from the lower fitting so that the closure member within the fitting automatically moves to seated position. At this time, a cover is disposed over the lower fitting, and another adapter 80 is connected to the coupling on the uppermost fitting, this adapter having male threads 81 for connection with the threads of the coupling and having a valve member therein including a valve steam extending to its lower end in position to be engaged by the head 82 on the end of a standard compressed air line 83. Consequently, upon pressing the head against the valve stem, air may be supplied from a suitable source of air under pressure (not shown) through the adapter, coupling, fitting and tube into the upper portion of the space within the tire in order to pressurize the liquid ballast added to the tire as described in connection with FIGS. 6 and 7. As previously mentioned, this air pressure need not be greater than that normally used in inflating tires of this type, and thus it presents no safety hazards.

As previously mentioned, the air line adapter is removed from the coupling and the coupling removed from the fitting to permit a cover to be connected over and about the uppermost fitting. At this time, the vehicle is ready for normal usage, while nevertheless capable of being easily and quickly prepared for use in fighting a fire in and around the vehicle. In the event a fire is encountered, or, alternatively, if the brakes, bearings or other parts of the vehicle require cooling, the cover is removed from the lowermost fitting to permit adapter 90 on the outer end of the hose to be connected to the coupling thereon. As shown in FIG. 10, the vehicle may be moved to a position in which the fitting is in the lowest possible position, although, as can be seen from FIG. 2, at least one fitting of the three is always at a relative low position. As previously described, and as shown in FIG. 1, this hose has a nozzle 26 on its outer end which may be opened to dispense liquid ballast at will.

From the foregoing it will be seen that this invention is one well adapted to attain all of the ends and objects hereinabove set forth, together with other advantages which are obvious and which are inherent to the fire fighting apparatus.

It will be understood that certain features and subcombinations are of utility and may be employed without reference to other features and subcombinations. This is contemplated by and is within the scope of the claims.

Because many possible embodiments may be made of the invention without departing form the scope thereof, it is to be understood that all matter herein set forth or shown in the accompanying drawings is to be interpreted as illustrative and not in a limiting sense.

What is claimed is:

1. For use in fighting fire in and around a self-propelled vehicle having large tubeless tires in which a liquid ballast may be contained, apparatus comprising a wheel having a rim on which one of said tires may be mounted, means forming a plurality of holes spaced generally equally about the rim to connect with the interior of the tire, a plurality of fittings each having inner and outer ends and a bore therethrough and means thereon for connection to a hole forming means, a plurality of flexible tubes each having one end connectible to the inner end of a fitting to dispose its other end near the inner side of the tire when fully inflated and upon connection of the tube to means forming one of the holes and being free to pass through the hole as the fitting is connected to and disconnected from the means forming the hole, each said fitting having a bore therethrough adapted to open to the tube to which it connects and an inwardly facing seat about the bore and a closure member yieldably urged toward a seated position to close the bore, a plurality of couplings each adapted to be moved into an inner position within the outer end of the bore of a fitting to engage and move the closure member to an unseated position, and means on each fitting and coupling adapted to releasably attach the coupling to the fitting in its inner position, each said coupling having a bore therethrough which opens to the fitting bore when attached thereto and means on its outer end to which a firs those may be connected in order to permit fire-fighting liquid to be added to a lower portion of the tire through one of said fittings to which one of the couplings is connected, as the space within the upper portion of the tire is vented through another fitting to which another coupling is connected, to which an air line may be connected for supplying air to the tire through a fitting to which the coupling is connected in order to pressurize the liquid in the tire, or to which a second hose having a nozzle on its outer end may be connected in order to dispense such pressurized liquid from the tire and through the fitting to which the coupling is connected upon opening of the nozzle.

2. Apparatus of the character as described in claim 1, wherein the hole forming means and fittings have threads thereon for connection to one another.

3. Apparatus of the character as described in claim 2, wherein, female threads are formed in the hole to receive male threads on the fitting.

4. Apparatus of the character described in claim 1, wherein,
the coupling has threads on its outer end.

5. Apparatus of the character described in claim 1, wherein
each tube is of somewhat greater length than the radial distance between the rim and inner side of the inflated tire and has a screen on its other end.

6. For use in fighting fire in and around a self-propelled vehicle having large tubeless tires in which is liquid ballast may be contained and wheels having rims on which the tires are mounted, and wherein the rim of one of the wheels of the vehicle on which one of said tires is mounted has means forming a plurality of holes spaced generally equally thereabout to connect with the interior of the tire, apparatus comprising
a plurality of fittings each having inner and outer ends and a bore therethrough and means thereon for connection to one of the hole forming means,
a plurality of flexible tubes each having one end connectible to the inner end of each fitting to dispose its other end near the inner side of the tire when fully inflated and upon connection of the tube to means forming one of the holes, and being free to pass through the hole in the fitting, as the fitting is connected to and disconnected from the means forming the hole,
each said fitting having a bore therethrough adapted to open to the tube to which it connects and an inwardly facing seat about the bore and a closure member yieldably urged toward a seated position to close the bore,
a plurality of couplings each adapted to be moved into an inner position within the outer end of the bore of a fitting to engage and move the closure member to an unseated position,
means on each fitting and coupling adapted to releasably attach the coupling to the fitting in its inner position,
a first hose connectible to one of the couplings and having means at its end for connection to a source of liquid, whereby fire fighting liquid may be added to the tire through the fitting to which the coupling is connected, as air within the upper portion of the tire is vented through the fitting to which another coupling is connected,
an adapter connectible to one of the couplings and having a valve with a stem therein and means at its other end to which an air line may be connected to permit air to be supplied to the space within the tire through the fitting to which the coupling is connected in order to pressurize the liquid in the tire, and
a second hose having means on one end for connection to one of the couplings and a nozzle on its other end to permit liquid ballast to be dispensed from the tire through the fitting to which the coupling is connected under the pressure of the air in the tire.

7. For use in fighting fire in and around a self-propelled vehicle having large tubeless tires in which a liquid ballast may be contained, apparatus comprising
a wheel having a rim on which one of said tires may be mounted,
means forming a plurality of holes spaced generally equally about the rim to connect with the interior of the tire,
a plurality of fittings each having inner and outer ends and a bore therethrough and means thereon for connection to a hole forming means,
a plurality of flexible tubes each having one end connectible to the inner end of a fitting to dispose its other end near the inner side of the tire when fully inflated and upon connection to the tube to means forming one of the holes and being free to pass through the hole as the fitting is connected to and disconnected from the means forming the hole,
each said fitting having a bore therethrough adapted to open to the tube to which it connects and an inwardly facing seat about the bore and a closure member yieldably urged toward a seated position to close the bore,
a plurality of couplings each adapted to be moved into an inner position within the outer end of the bore of a fitting to engage and move the closure member to an unseated position, and
means on each fitting and coupling adapted to releasably attach the coupling to the fitting in its inner position,
each said coupling having a bore therethrough which opens to the fitting bore when attached thereto and means on its outer end to which a first hose may be connected in order to permit fire-fighting liquid to be added to a lower portion of the tire through one of said fittings to which one of the couplings is connected, as the upper portion of the tire is vented through another fitting to which another coupling is connected, to which an air line may be connected for supplying air to the tire through a fitting to which the coupling is connected in order to pressurize the liquid in the tire, or to which a second hose having a nozzle on its outer end may be connected in order to dispense such pressurized liquid from the tire and through the fitting to which the coupling is connected upon opening of the nozzle, and
a plurality of covers each having means for connection to the rim over and about a fitting to protect it from damage when the coupling is removed.

8. Apparatus of the character described in claim 7, wherein each hole forming means comprises
a hole formed in the rim and a boss secured to the rim and having a hole therethrough forming a continuation of the hole in the rim, and having means thereon which a cover may be connected.

9. For use in fighting fire in and around a self-propelled vehicle having large tubeless tires in which a liquid ballast may be contained, apparatus comprising
a wheel having a rim on which one of said tires may be mounted and a plurality of holes spaced generally equally about the rim to connect with the interior of the tire,
bosses secured to the rim each having a hole therethrough forming a continuation of a hole through the rim and threads surrounding the hole,
a plurality of fittings each having inner and outer ends and a bore therethrough and threads thereon for connection to boss,
a plurality of flexible tubes each having one end connectible to the inner end of a fitting to dispose its other end near the inner side of the tire when fully inflated and upon connection of the tube to means forming one of the holes and being free to pass through the holes in the rim and boss as the fitting is connected to and disconnected from the boss, each said fitting having a bore therethrough adapted to open to the tube to which it connects and an inwardly facing seat about the bore and a closure member yieldably urged toward a seated position to close the bore, a plurality of couplings each adapted to be moved into an inner position within the outer end of the bore of a fitting to engage and move the closure member to an unseated position, and means on each fitting and coupling adapted to releasably attach the coupling to the fitting in its inner position, each said coupling having a bore therethrough which opens to the fitting bore when attached thereto and means on its outer end to which a first hose may be connected in order to permit fire-fighting liquid to be added to a lower portion of the tire through one of said fittings to which one of the couplings is connected, as the upper portion of the tire is vented through another fitting to which another coupling is connected, to which an air line may be connected for supplying air to the tire through a fitting to which the coupling is connected in order to pressurize the liquid in the tire, or to which a second hose having a nozzle on its outer end may be connected in order to dispense such pressurized liquid from the tire and through the fitting to which the coupling is connected upon opening of the nozzle.

10. For use in fighting fire in and around a self-propelled vehicle having large tubeless tires in which a liquid ballast may be contained and wheels having rims on which the tires are mounted, and wherein the rim of one of the wheels of the vehicle on which one of said tires is mounted has means forming a plurality of holes spaced generally equally thereabout to connect with the interior of the tire, apparatus comprising a plurality of fittings each having inner and outer ends and a bore therethrough and means thereon for connection to one of the hole forming means, a plurality of flexibles tubes each having one end connectible to the inner end of each fitting to dispose its other end near the inner side of the tire when fully inflated and upon connection of the tube to means forming one of the holes, and being free to pass through the hole in the fitting, as the fitting is connected to and disconnected from the means forming the hole, each said fitting having a bore therethrough adapted to open to the tube to which it connects and an inwardly facing seat about the bore and a closure member yieldably urged toward a seated position to close the bore, a plurality of couplings each adapted to be moved into an inner position within the outer end of the bore of a fitting to engage and move the closure member to an unseated position, means on each fitting and coupling adapted to releasably attach the coupling to the fitting in its inner position, a first adapter connectible to one of the couplings and having means at its end to which a first hose may be connected for supplying fire fighting liquid to the tire through the fitting to which the coupling is connected, as air within the upper portion of the tire is vented through the fitting to which another coupling is connected, a second adapter connectible to one of the couplings and having a valve with a stem therein and means at its end to which an air line may be connected to permit air to be supplied to the space within the tire through the fitting to which the coupling is connected in order to pressurize the liquid in the tire, and a second hose having means on end end for connection to one of the couplings and a nozzle on its other end to permit liquid ballast to be dispensed from the tire through the fitting to which the coupling is connected under the pressure of the air in the tire.

11. For use in fighting fire in and around a self-propelled vehicle having large tubeless tires in which a liquid ballast may be contained and wheels having rims on which the tires are mounted, and wherein the rim of one of the wheels of the vehicle on which one of said tires is mounted has means forming a plurality of holes spaced generally equally thereabout to connect with the interior of the tire, apparatus comprising a plurality of fittings each having inner and outer ends and a bore therethrough and means thereon for connection to one of the hole forming means, a plurality of flexibles tubes each having one end connectible to the inner end of each fitting to dispose its other end near the inner side of the tire when fully inflated and upon connection of the tube to means forming one of the holes, and being free to pass through the hole in the fitting, as the fitting is connected to and disconnected from the means forming the hole, each said fitting having a bore therethrough adapted to open to the tube to which it connects and an inwardly facing seat about the bore and a closure member yieldably urged toward a seated position to close the bore, a plurality of couplings each adapted to be moved into an inner position within the outer end of the bore of a fitting to engage and move the closure member to an unseated position, means on each fitting and coupling adapted to releasably attach the coupling to the fitting in its inner position, a first adapter connectible to one of the couplings and having means at its end to which a first hose may be connected for supplying fire fighting liquid to the tire through the fitting to which the coupling is connected, as air within the upper portion of the tire is vented through the fitting to which another coupling is connected, a second adapter connectible to one of the couplings and having a valve with a stem therein and means at its end to which an air line may be connected to permit air to be supplied to the space within the tire through the fitting to which the coupling is connected in order to pressurize the liquid in the tire, and a third adapter connectible to one of the couplings and having means at its end to which a second hose having a nozzle on its end may be connected so that liquid ballast may be dispensed from the tire through the fitting to which the coupling is connected under the pressure of the air in the tire.

* * * * *